Figure 1:
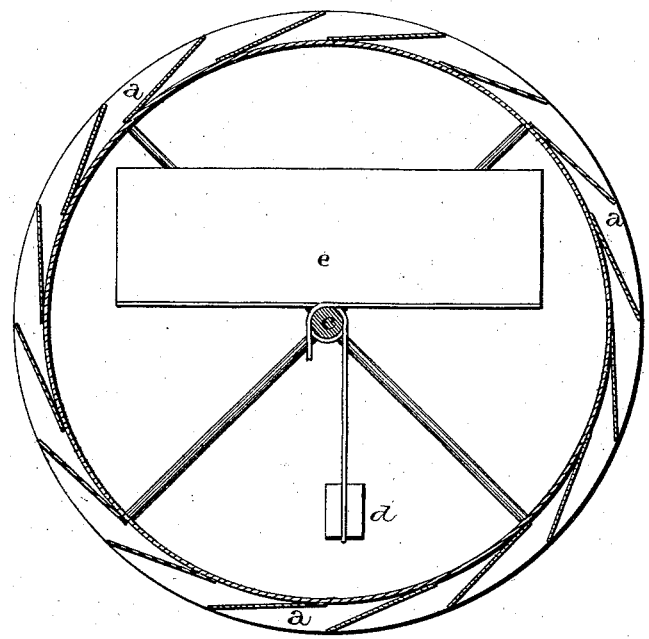
Figure 2:
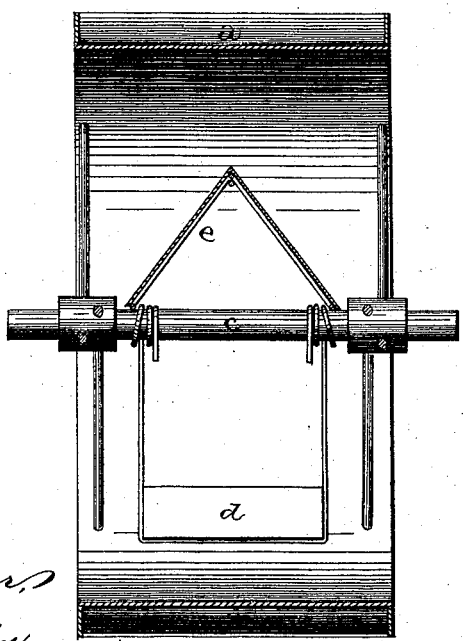

W. S. WATKINS.
HORSE AND WATER-POWER APPARATUS.

No. 169,391. Patented Nov. 2, 1875.

WITNESSES.

INVENTOR.

UNITED STATES PATENT OFFICE.

WILLIAM S. WATKINS, OF ST. LOUIS, MISSOURI.

IMPROVEMENT IN HORSE AND WATER POWER APPARATUS.

Specification forming part of Letters Patent No. 169,391, dated November 2, 1875; application filed October 19, 1875.

*To all whom it may concern:*

Be it known that I, WILLIAM S. WATKINS, of St. Louis, in the county of St. Louis and State of Missouri, have invented certain new and useful Improvements in Combined Horse and Water Power; and I do hereby declare the following to be a full, clear, and exact description of the invention, such as will enable others skilled in the art to which it pertains to make and use it, reference being had to the accompanying drawings which form part of this specification.

My invention relates to an improvement in combined horse and water powers; and it consists in the arrangement and combination of parts that will be more fully described hereinafter, whereby an overshot or breast wheel can be used as a horse-power when there is not sufficient water to run the wheel in summer. It further consists in a self-cleaning device, whereby all the dirt and manure from the horses are thrown outside of the wheel.

The accompanying drawings represent my invention.

$a$ represents a large overshot or breast water-wheel, which is secured to its shaft $c$ by suitable braces, so as to cause the shaft to revolve with it instead of having the wheel revolve around the shaft. During those months of the year when there is sufficient water in the stream the wheel will be run by water-power alone; but when the water-power fails, then the wheel is converted into a horse-power by putting horses inside of it, and having them work it in the usual manner.

Suspended from the revolving shaft $c$, by suitable rods, so that it will always hang vertically, is a weight, or a combined weight and trough, $d$. Connected with this weight or trough, by means of rods, in any suitable manner, is the triangular frame $e$, that is covered over with canvas or any other suitable material. The weight and this frame are so connected together that while the weight always hangs vertically the frame always maintains a horizontal position over the horses and driver. This triangular frame serves the double purpose of a yielding means for fastening the horses to, and to throw off, outside of the wheel, all the dirt and manure that may be carried up by the wheel to a certain distance, and which would, were it not for this frame, fall back upon the horses, and thus be kept constantly in the wheel. By means of this frame, which may also serve to protect the driver and horses from the sun, the wheel is thus automatically cleaned.

The weight $d$ may be used as a seat for the driver, and as a trough in which to feed the horses, and should be just heavy enough to keep the frame always horizontal.

In all those mills that are run by streams that run dry, or get very low in summer, the mill is brought to a stand as soon as the water-power fails, and then a steam-engine must be used to run the works, or the mill remain idle. By means of my invention the same wheel that is run by water is thus converted into a horse-power.

Having thus described my invention, I claim—

1. A water-wheel, having its interior surface so formed that it is adapted to receive horses or other animals, for the purpose of operating it, whereby a convertible horse or water power is formed, as described.

2. The wheel $a$, shaft $c$, weight $d$, and frame $e$, the parts being combined for operation, as shown.

In testimony that I claim the foregoing I have hereunto set my hand this 18th day of October, 1875.

WILLIAM S. WATKINS.

Witnesses:
F. A. LEHMANN,
T. E. INGHAM.